W. SCHMIDT.
DEVICE FOR COOLING THE PISTON OF AN INTERNAL COMBUSTION ENGINE.
APPLICATION FILED JAN. 18, 1916.
1,223,622.
Patented Apr. 24, 1917.
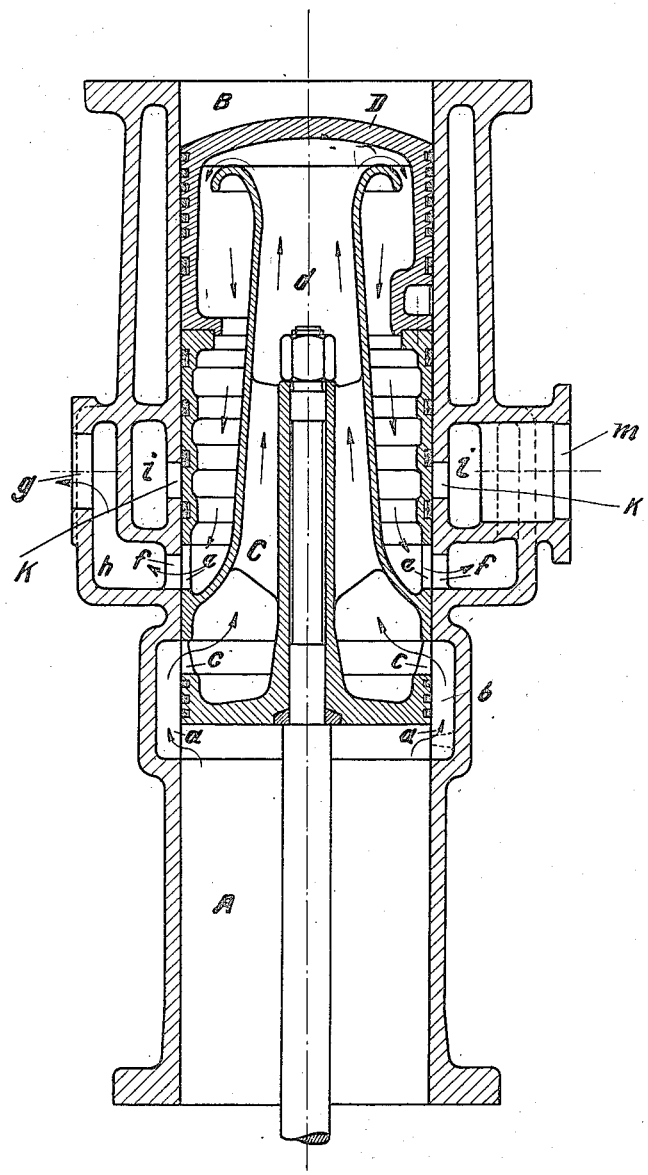
WITNESSES:
INVENTOR
WILHELM SCHMIDT
BY
ATTORNEYS

UNITED STATES PATENT OFFICE.

WILHELM SCHMIDT, OF CASSEL-WILHELMSHÖHE, GERMANY.

DEVICE FOR COOLING THE PISTON OF AN INTERNAL-COMBUSTION ENGINE.

1,223,622.

Specification of Letters Patent.

Patented Apr. 24, 1917.

Application filed January 18, 1916. Serial No. 72,742.

*To all whom it may concern:*

Be it known that I, WILHELM SCHMIDT, a subject of the German Emperor, King of Prussia, residing at Cassel-Wilhelmshöhe, Germany, have invented a new and useful Improved Device for Cooling the Piston of an Internal-Combustion Engine, of which the following is a specification.

The invention is intended for use in connection with the method for cooling the piston of an internal combustion engine described in my application Ser. No. 72741, filed Jan. 18, 1916.

My invention relates to internal combustion engines, particularly to such engines as have means for cooling the piston and associated parts, and has, for a general object, to provide a novel means, free from certain difficulties hitherto met with, for accomplishing such cooling. A special object of my invention is to provide a novel construction of internal combustion engine piston. My invention is most usefully embodied in that type of internal combustion engine which is operated in combination with a steam engine, preferably of the multi expansion type.

In combustion engines the working piston and the cylinder walls are directly exposed to the excessively high temperatures of combustion and, therefore, themselves tend to assume a very high temperature. A cooling of the cylinder walls and, particularly, of the piston proper is, therefore, greatly to be desired. So far as concerns the piston, however, structural and operative difficulties together with the entailed loss of heat has caused such cooling to be very little practised. Should the dimensions of the combustion cylinder, however, exceed a certain limit, which limit is attained earlier in the case of two cycle engines than in the case of four cycle engines, this piston cooling becomes absolutely necessary.

Hitherto cooling of the piston has been principally effected by means of fluids, water or oil, for example, air has also been proposed as a substitute for fluids. In cooling with fluids the constructions proposed have involved considerable complexity, particularly as regards the arrangement of the inlet and outlet conduits, which has affected the certainty of operation of the engine; furthermore, fluid weight in the piston has necessarily increased the mass of the moving parts and hence disturbed the smooth running of the engine. In cooling with air, on the other hand, it has been found impossible to sufficiently reduce the temperature of the piston. Furthermore, whether fluid cooling or air cooling has been practised, in either case there has been no effective utilization of the abstracted heat.

By means of my invention herein described the above referred to disadvantages are avoided and an effective cooling of the piston provided, together with an efficient utilization of the abstracted heat.

Briefly described, my invention comprises means for employing exhaust steam as a cooling medium, said steam being led through one or more hollow spaces of the piston. As the steam thus flows over the parts heat is abstracted from the piston and associated parts and such parts are cooled; simultaneously the abstracted heat dries and superheats the steam which may then be utilized in any desired manner, or the steam may be exhausted to the atmosphere.

My novel device will be found especially applicable to combined combustion and steam engines, particularly when the steam engine is of the multi-expansion type. In such combination engines the exhaust steam may be taken from the high pressure cylinder, or from one of the low-pressure cylinders, through the combustion engine piston, from which it abstracts heat which dries and superheats the steam; the steam is then carried to a steam cylinder or cylinders of lower pressure. Thus there is solved the difficult problem referred to of drying and superheating steam which has already performed work and of utilizing said steam so as to secure a return from the heat which has been used to perform such drying and superheating.

In carrying out my invention a preferred embodiment is a combination internal combustion and steam engine which employs a common cylinder having a combustion space at one end and a steam space at the other. This embodiment affords the advantage that steam may be led through the piston by the shortest possible path.

Such a preferred embodiment is shown in the accompanying drawing which represents a central longitudinal section through the common cylinder of a combined two cycle combustion engine and a steam engine having slotted outlets.

Referring to the drawing a cylinder of uniform diameter has a steam space A at one end and a combustion space B at the other end. A combined steam and combustion piston is adapted to move in this cylinder the end D closing the combustion space and the other end closing the steam space. The piston is made hollow with peripheral slots $c$ opening therefrom near its steam end and other similar slots $e$, also opening therefrom but separated from slots $c$ by a partition wall formed as a tube C which tapers toward, and whose open end terminates near, the inner surface of the combustion end D.

The partition wall C is, however, flared outwardly near and at its extreme end so as to cause the exhaust steam issuing forth from the interior of the partition wall C to wash the whole area of the inner surface of the piston at its end D.

Other peripheral slots $a$ are also provided at the very end of the piston which slots open into the steam space A.

An internal annular recess $b$, into which piston slots $a$ and $c$ are adapted to simultaneously open at the close of the steam expansion period, is provided.

An annular channel $h$, surrounds a similar channel $i$ into which latter channel the exhaust combustion gases are discharged, the two channels having a common separating wall. The inner wall of each of these channels constitutes part of the cylinder wall and in these inner walls are provided inlet openings $f$, for channel $h$, and inlet openings $k$, for channel $i$. The two channels are also provided with outlet openings $g$ and $m$ respectively.

The operation of my invention is as follows: In the position shown in the drawing, the steam expansion period being over, both slots $a$ and $c$ open into recess $b$. The exhaust steam, therefore, streams through these slots, by way of recess $b$, and up through the tube C against the inner surface of combustion end D of the piston. Here, it reverses direction and, by reason of the eddying thereby brought about, brings about an intensive cooling of the combustion end of the piston. The steam then passes downwardly over the inner peripheral wall of the piston, cooling it as it goes, and leaves the piston by way of slots $e$ and $f$, now in coincidence, channel $h$ and outlet $g$.

As the exhaust steam passes through channel $h$ it abstracts heat which has been given to the partition wall common to channels $h$ and $i$ by the exhaust combustion gases previously discharged through inlets $k$ and channel $i$ after the piston has made its combustion power stroke.

In the construction of my invention the steam working space, from which the exhaust steam is to be taken for cooling purposes, may be determined, according to the conditions present at the time, either as a single working stage, or as a high pressure or as an intermediate stage. In all such cases it is advisable to determine the exhaust pressure of the combustion gases at something higher than one atmosphere absolute as, in this way, any carrying of such gases or of oil residues back into the steam space is avoided.

The structure illustrated and described may be varied in details within the spirit of my invention. Thus it is not essential that there be but one combined combustion and steam piston and a common cylinder therefor and steam cylinder and piston may be separated from combustion cylinder and piston if desired. The exhaust inlets and outlets, also, may be valves of any desired type instead of simple slots as shown.

Having described my invention, I claim:

1. A combined steam and internal combustion engine comprising a steam cylinder and piston, a combustion cylinder and piston, an exhaust steam connection from the steam cylinder and a passage through the body of the combustion piston both ends of said passage terminating in the peripheral wall of the combustion piston, one of said ends being adapted to be connected with the exhaust steam connection and the other end being adapted to be connected with the outside of the cylinder.

2. A combined steam and internal combustion engine comprising a combustion piston and a steam piston joined end to end, a cylinder common to both pistons having a combustion space at one end and a steam space at the other end, and means for flowing exhaust steam through the body of the combustion piston to its peripheral wall and thence to the outside of the cylinder when the steam piston has made its expansion stroke.

3. A combined steam and internal combustion engine comprising a combustion piston and a steam piston joined end to end, a cylinder common to both pistons having a combustion space at one end and a steam space at the other end, an inner partition wall adapted to conduct the exhaust steam from the steam end of the cylinder to and against the inner end surface of the piston at the combustion side, the free end of said partition wall being turned into a flange adapted to cause the exhaust steam to wash the whole area of said inner surface.

4. A combined steam and internal combustion engine comprising a hollow piston having closed ends, and a cylinder for said piston having a combustion space at one end and a steam space at the other end, the cylinder having an annular recess and the piston having annular slots which register with said recess when the piston has made its steam expansion stroke thereby admitting steam to the piston, and means for connecting the inside of the piston with the outside of the cylinder simultaneously with the admission of the exhaust steam thereto.

5. A combined steam and internal combustion engine comprising a hollow piston having opposite pressure receiving ends, a cylinder for said piston having a combustion space at one end and a steam space at the other, two sets of annular openings in said piston near the steam end thereof, a tubular partition wall separating said sets of openings and terminating near the combustion end of the piston, and means for connecting one set of openings with the outside of the cylinder when the steam piston has made its expansion stroke.

6. In a combined internal combustion and steam engine, the combination, with the combustion cylinder and its piston, of means for conducting the exhaust steam from the steam space through said pistons; two annular channels encompassing the combustion cylinder; a partition wall between said channels and adapted to transfer heat from one of said channels to the other one; connections between the exhaust end of the combustion space and one of the said channels, and connections between the exhaust steam outlet of said piston and the other of the said channels, and an outlet from each of the annular channels.

7. A combined steam and internal combustion engine comprising a steam cylinder and piston, a combustion cylinder and hollow piston, a steam passage adapted to connect the steam cylinder with the interior of the hollow combustion piston when the steam piston has made its expansion stroke and a separate connection between the hollow piston and the outside of the cylinder through which the exhaust steam is finally permitted to pass.

In testimony whereof I have hereunto set my hand in the presence of two subscribing witnesses.

WILHELM SCHMIDT.

Witnesses:
GUSTAV TAUBE,
JEAN GRUND.